US012454069B2

(12) United States Patent
Varghese et al.

(10) Patent No.: US 12,454,069 B2
(45) Date of Patent: Oct. 28, 2025

(54) ELECTRIC SHAVER WITH MUTUALLY DIFFERENT HAIR-CUTTING UNITS

(71) Applicant: KONINKLIJKE PHILIPS N.V., Eindhoven (NL)

(72) Inventors: Babu Varghese, Eindhoven (NL); Yannyk Parulian Julian Bourquin, Eindhoven (NL); Jonathan Alambra Palero, Waalre (NL); Lu Wang, Eindhoven (NL); Oedilius Johannes Bisschop, Drachten (NL); Willem Auke Westerhof, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 212 days.

(21) Appl. No.: 18/283,835

(22) PCT Filed: Mar. 17, 2022

(86) PCT No.: PCT/EP2022/056898
§ 371 (c)(1),
(2) Date: Sep. 25, 2023

(87) PCT Pub. No.: WO2022/207330
PCT Pub. Date: Oct. 6, 2022

(65) Prior Publication Data
US 2024/0173879 A1 May 30, 2024

(30) Foreign Application Priority Data
Mar. 30, 2021 (EP) .................................... 21165782

(51) Int. Cl.
*B26B 19/14* (2006.01)

(52) U.S. Cl.
CPC .......... *B26B 19/146* (2013.01); *B26B 19/143* (2013.01); *B26B 19/145* (2013.01)

(58) Field of Classification Search
CPC .... B26B 19/146; B26B 19/143; B26B 19/145
See application file for complete search history.

(56) References Cited

U.S. PATENT DOCUMENTS 4,688,329 A 8/1987 Oord
5,377,414 A * 1/1995 Buzzi ...................... B26B 19/26 30/346.51

(Continued)

FOREIGN PATENT DOCUMENTS

CN 2915412 Y 6/2007
CN 204525538 U 8/2015

OTHER PUBLICATIONS

International Search report and Written Opinion of PCT/EP2022/056898, dated Jun. 27, 2022.

*Primary Examiner* — Sean M Michalski

(57) ABSTRACT

Electric shaver (1) having a main body (3) and a shaving unit (5) coupled to the main body. The shaving unit has three hair-cutting units (9*a*, 9*b*, 9*c*) each having an external cutting member (11) with a skin-contact surface (13) with hair-entry openings (15) and an internal cutting member (17) which is rotatable relative to the external cutting member. The hair-cutting units each have at least one geometric parameter (w) that influences a hair-cutting process of each individual hair-cutting unit. The shaving unit can be positioned relative to the main body in at least two different angular positions about a central axis (37) of the shaving unit. A value of the geometric parameter of at least one of the hair-cutting units is different from the values of the geometric parameter of the other hair-cutting units.

7 Claims, 5 Drawing Sheets

(56) References Cited

U.S. PATENT DOCUMENTS

| | | | | |
|---|---|---|---|---|
| 5,621,971 | A * | 4/1997 | Szymansky | B26B 19/14 30/34.2 |
| 6,378,210 | B1 * | 4/2002 | Bickford | B26B 19/3813 30/43.92 |
| 7,900,359 | B2 * | 3/2011 | Royle | B26B 19/105 30/43.92 |
| 8,925,205 | B2 * | 1/2015 | Iwasaki | B26B 19/384 30/34.2 |
| 9,174,349 | B2 | 11/2015 | Schmitt | |
| 10,836,058 | B2 * | 11/2020 | Omori | B26B 19/384 |
| 10,946,536 | B2 * | 3/2021 | Winters | B26B 19/146 |
| 10,987,819 | B2 * | 4/2021 | Huai | B26B 19/14 |
| 11,141,871 | B2 | 10/2021 | Paauw et al. | |
| 12,036,685 | B2 * | 7/2024 | Darwinkel | B26B 19/38 |
| 2009/0056148 | A1 * | 3/2009 | Royle | B26B 19/105 30/277.4 |
| 2010/0139099 | A1 * | 6/2010 | Blaauw | B26B 19/044 30/346.54 |
| 2013/0000126 | A1 * | 1/2013 | Higuchi | B26B 19/384 30/34.2 |
| 2014/0157957 | A1 * | 6/2014 | Mimura | B26B 19/143 76/116 |
| 2017/0144317 | A1 * | 5/2017 | Shimizu | B26B 19/3893 |
| 2018/0243930 | A1 * | 8/2018 | Omori | B26B 19/42 |
| 2019/0366568 | A1 * | 12/2019 | Huai | B26B 19/14 |
| 2020/0094424 | A1 * | 3/2020 | Chan | B26B 19/28 |
| 2020/0361104 | A1 | 11/2020 | Paauw et al. | |
| 2021/0122069 | A1 * | 4/2021 | Ohara | B26B 19/046 |
| 2022/0212358 | A1 | 7/2022 | Petrelli et al. | |
| 2022/0402152 | A1 * | 12/2022 | Darwinkel | B26B 19/14 |
| 2024/0217127 | A1 * | 7/2024 | Van Den Berg | B26B 19/14 |

* cited by examiner

ELECTRIC SHAVER WITH MUTUALLY DIFFERENT HAIR-CUTTING UNITS

CROSS-REFERENCE TO PRIOR APPLICATIONS

This application is the U.S. National Phase application under 35 U.S.C. § 371 of International Application No. PCT/EP2022/056898, filed on Mar. 17, 2022, which claims the benefit of European Patent Application No. 21165782.0, filed on Mar. 30, 2021. These applications are hereby incorporated by reference herein.

FIELD OF THE INVENTION

The invention relates to an electric shaver comprising a main body and a shaving unit coupled to the main body, wherein:

- the shaving unit comprises at least three hair-cutting units and a supporting member supporting the at least three hair-cutting units; and
- each hair-cutting unit comprises an external cutting member with a skin-contact surface provided with hair-entry openings, and an internal cutting member which is rotatable relative to the external cutting member.

BACKGROUND OF THE INVENTION

Rotary-type electric shavers are well known. Such shavers usually have two or three hair-cutting units which each comprise an external cutting member, having an annular hair-cutting track comprising a plurality of hair-entry openings, and an internal cutting member having a plurality of hair-cutting elements arranged in an annular configuration for co-operation with the annular hair-cutting track of the external cutting member. The hair-cutting units are supported by a supporting member and form a shaving unit together with the supporting member. The shaving unit is coupled to a main body of the shaver, which functions as a handle of the shaver and may accommodate an electric motor for driving the internal cutting members of the hair-cutting units into rotation. The shaving unit may be manually decoupled from the main body, so that it can for example be replaced by a different kind of functional unit such as a hair-trimming unit or a facial brushing unit.

It is generally known that the hair-cutting process of such electric shavers is influenced by a value of one or more geometric parameters of the individual hair-cutting units, wherein each geometric parameter relates to a corresponding geometric property of the hair-cutting units. Such a geometric property is, for example, the shape or dimension of the hair-entry openings of the external cutting members, or the shape of the cutting edges provided on the internal cutting members and on the external cutting members. A disadvantage of such electric shavers is that such geometric parameters of the hair-cutting units have predefined fixed values. As a result, the electric shaver provides an optimum shaving result only for a limited group of users, for example for an average type of user.

Important aspects of the shaving result of an electric shaver are the closeness of the hair-cutting process, i.e. the hair-stubble length remaining after the hair-cutting process, and the degree of skin irritation caused by the hair-cutting process. As a general rule, skin irritation will increase with increasing closeness. Because different users experience different degrees of skin irritation under comparable use conditions of the shaver, while at the same time different users cause different use conditions, e.g. as regards the pressure exerted on the shaver during use, the shaving result provided by known rotary-type electric shavers is far from optimum for a large group of users. In order to mitigate this problem, it has been proposed to provide a rotary-type electric shaver with a mechanism or system configured to adjust a particular operational parameter of the shaving unit that influences the hair-cutting process of the hair-cutting units. For example, EP3738730A1 discloses a rotary type electric shaver wherein the hair-cutting units each have a skin-supporting surface that surrounds the external cutting member. This known shaver has a system configured to automatically adjust the so-called cap exposure of the hair-cutting units, which is the distance over which the skin-contact surfaces of the external cutting members of the hair-cutting units protrude relative to said surrounding skin-supporting surfaces in an axial direction parallel to the rotational axes of the internal cutting members. In general, with an increasing cap exposure the closeness of the hair-cutting process will increase, but the degree of skin irritation may also increase, i.e. the degree of skin comfort may decrease. Thus, by adjusting the cap exposure, the shaving result of this known shaver can be better adapted to the needs of an individual user. However, such a mechanism or system for adjusting an operational parameter of the shaving unit is rather complex and increases the manufacturing costs of the shaver.

An electric shaver of a type as mentioned in the section “Field of the Invention”, wherein the shaving unit is further configured to be positionable relative to the main body in at least two different angular positions about a central axis of the supporting member which extends transversely relative to the skin-contact surfaces of the external cutting members, is disclosed by U.S. Pat. No. 4,688,329. The shaving unit of this known shaver has three hair-cutting units which are mutually arranged in a tri-angular configuration. The shaving unit is mounted to the main body such that it is manually rotatable relative to the main body about the central axis of the shaving unit. Thereby, the shaving unit can be rotated about its central axis into various positions oriented differently relative to the main body. In a first rotational position of the shaving unit, with the shaver in an upright position, two of the three hair-cutting units are arranged above the third hair-cutting unit. In this first rotational position of the shaving unit, the shaver is suitable for use on a relatively large surface area of the face, such as the cheek, with all three hair-cutting units in contact with the skin. In a second rotational position of the shaving unit, with the shaver in an upright position, one of the three hair-cutting units is arranged above the other two hair-cutting units. In this second rotational position of the shaving unit, the shaver is suitable for more precise use on a relatively narrow surface area of the face, such as the upper lip, with only said one of the three hair-cutting units in contact with the skin.

SUMMARY OF THE INVENTION

An object of the present invention is to improve an electric shaver of a type as mentioned in the section “Field of the Invention”, wherein the hair-cutting units each have at least one geometric parameter relating to a corresponding geometric property of the hair-cutting units, and wherein a hair-cutting process of each individual hair-cutting unit is influenced by a value of said at least one geometric parameter of said individual hair-cutting unit. In particular, an object of the present invention is to improve such an electric shaver in such a way that it enables adaptation of the overall shaving result of the shaver to the needs of an individual user without the use of a complex mechanism or system for adjusting one or more operational parameters of the shaving unit and at relatively low additional manufacturing costs.

According to the invention, in order to achieve said object, in an electric shaver as described in the previous paragraph the supporting member of the shaving unit has a central axis which extends transversely relative to the skin-contact surfaces of the external cutting members, wherein the shaving unit is configured to be positionable in at least two different angular positions about the central axis relative to the main body and coupled to the main body, and wherein the value of said at least one geometric parameter of at least one of the hair-cutting units is different from the values of said at least one geometric parameter of the other hair-cutting units.

The invention is based on the insight that, in an electric shaver comprising a shaving unit having at least three hair-cutting units of a rotary type, a degree at which each individual hair-cutting unit contributes to the overall shaving result of the shaving unit depends on the position of said individual hair-cutting unit relative to the main body and relative to the other hair-cutting units when the main body is held by the user's hand during the shaving process. In general, one or two of the at least three hair-cutting units provide a more prominent, i.e. a larger, contribution to the overall shaving result of the shaving unit as compared to the other shaving unit or units. Because, in accordance with the invention, for at least one of the hair-cutting units at least one geometric parameter, that influences the hair-cutting process of the hair-cutting units, has a value which is different from the values of said at least one geometric parameter of the other hair-cutting units, the overall shaving result of the shaving unit can be adapted by adapting the angular position of the shaving unit about the central axis relative to the main body. In particular, by adapting said angular position of the shaving unit, the position of said at least one of the hair-cutting units, for which the value of said at least one geometric parameter is different as compared with the other hair-cutting units, will change relative to the main body and relative to the other hair-cutting units, so that the degree at which said hair-cutting unit contributes to the overall shaving result of the shaving unit will change and the overall shaving result of the shaving unit will change.

The expression "geometric parameter" has to be understood as a parameter that relates to a corresponding geometric property of the hair-cutting units, wherein said geometric property is a geometric property that influences the hair-cutting process of each individual hair-cutting unit. With "geometric property" is meant any property relating to the geometry of the hair-cutting units, including any dimensional or shape-related property. With "corresponding geometric property" is generally meant a geometric property of corresponding parts of the hair-cutting units or in corresponding positions on or within the hair-cutting units. For example, when the hair-cutting units each have a plurality of parts of a particular kind, such as a plurality of hair-entry openings or cutting elements, the expression "corresponding geometric property" generally refers to a geometric property of such parts present in corresponding positions on or within the hair-cutting units. Thus, when for example the hair-cutting units each have an external cutting member with a plurality of hair-entry openings of mutually different shapes and/or mutually different dimensions, the expression "corresponding geometric property", when used in relation to the hair-entry openings, refers to a geometric property of the hair-entry openings present in corresponding positions on the external cutting members. In other words, in a shaving unit having three identical hair-cutting units not covered by the present invention, the hair-cutting units have identical corresponding geometric properties, even when the hair-cutting units individually have a plurality of parts of a particular kind (such as hair-entry openings, cutting elements or cutting edges) with mutually different geometric properties.

It will be clear for the skilled person that the differences between the values of a geometric parameter of the hair-cutting units contemplated in accordance with the invention do not relate to usual manufacturing tolerances. In this context, the value of said at least one geometric parameter of at least one of the hair-cutting units may preferably be understood to be at least 5%, preferably at least 10% different from the values of said at least one geometric parameter of the other hair-cutting units. Similarly, the at least two different angular positions wherein the shaving unit is positionable relative to the main body in accordance with the invention do not relate to the usual mechanical play of a coupling structure by means of which the shaving unit may be coupled to the main body. In this context, said two different angular positions may preferably be understood to mutually include an angle of at least 10°, preferably at least 30° about the central axis of the shaving unit.

Examples of a geometric parameter relating to a corresponding geometric property of the hair-cutting units that influences the hair-cutting process of each individual hair-cutting unit include a geometric parameter of the hair-entry openings in corresponding positions on the external cutting members of the hair-cutting units, such as the length, the width or the longitudinal orientation of the hair-entry openings when the openings are slot-shaped, the diameter of the hair-entry openings when the openings are circular, or the depth of the hair-entry openings. Another example of such a geometric parameter is a geometric parameter of a cutting edge in corresponding positions on the internal cutting members or on the external cutting members of the hair-cutting units, such as a wedge angle enclosed by the facets of the cutting edge or an orientation of the cutting edge. Another example of such a geometric parameter is a geometric parameter of a cross-sectional profile of a wall section of the external cutting member present between adjacent hair-entry openings in corresponding positions on the external cutting members of the hair-cutting units, such as an average thickness or length of said profile. According to the invention, one or more of such geometric parameters of at least one of the hair-cutting units have a value which is different from the values of said one or more geometric parameters of the other hair-cutting units. Thus, in an example of a shaving unit with three hair-cutting units, two of the three hair-cutting units may have an identical geometry and the third hair-cutting unit has a geometry different from the geometry of said two hair-cutting units. Alternatively, all three hair-cutting units have mutually different geometries.

In a preferred embodiment of an electric shaver according to the invention, the shaving unit is manually decouplable from the main body and manually couplable to the main body into each of said at least two different angular positions about the central axis. This embodiment has a particularly simple structure, because it does not require any additional adjustment mechanism or system. It can be simply realized by providing the main body and the shaving unit with a coupling mechanism that allows the shaving unit to be manually coupled to the main body in each of said at least two different angular positions.

In a further embodiment of an electric shaver according to the invention, the shaving unit is coupled to the main body such as to be rotatable relative to the main body about the central axis into each of said at least two different angular positions. This embodiment has a simple structure, because it does not require any additional adjustment mechanism or system. It can be simply realized by connecting the shaving unit to the main body by means of, for example, a rotational bearing that allows the shaving unit to rotate relative to the main body into each of said at least two different angular positions. In a particularly simple embodiment, the shaving unit is manually rotatable relative to the main body by the user. In another embodiment, the shaving unit is rotatable relative to the main body by means of an actuator, for example by means of an electric motor arranged in the main body. In this embodiment, a control member may be provided on the main body for the user to activate said actuator.

In a preferred embodiment of an electric shaver according to the invention, the value of said at least one geometric parameter of each hair-cutting unit is different from the value of said at least one geometric parameter of each of the other hair-cutting units. This embodiment provides a relatively high number of different settings for the shaving result. It allows any selected one of the hair-cutting units or, in embodiments with three hair-cutting units, any selected combination of two hair-cutting units of the shaving unit to be positioned in a more prominent position relative to the main body, such that the overall shaving result of the shaving unit is influenced at a relatively large degree by said selected one or selected combination of the hair-cutting units.

In a further embodiment of an electric shaver according to the invention, the shaving unit comprises three hair-cutting units mutually arranged in a tri-angular configuration, and the shaving unit is configured to be positionable in at least three different angular positions about the central axis relative to the main body. This embodiment provides a relatively high number of different settings for the shaving result. For a shaving unit with three hair-cutting units mutually arranged in a tri-angular configuration, it was found that, when the main body is held by the user's hand in an upright position during the shaving process, the hair-cutting unit or units which are arranged in an uppermost position relative to the main body have a more dominant influence on the overall shaving result of the shaving unit as compared with the hair-cutting unit or units which are arranged in a lower position. Accordingly, the user can simply adjust the shaving result to his personal needs by arranging a selected one of the three hair-cutting units or a selected combination of two of the three hair-cutting units in said uppermost position relative to the main body. In this embodiment, the shaving unit is positionable relative to the main body in at least three different angular positions about the central axis which preferably mutually include an angle of about 120°, wherein in each of these three angular positions a respective one of the hair-cutting units or a respective combination of two of the hair-cutting units is arranged in said uppermost position relative to the main body. Alternatively, in this embodiment the shaving unit is positionable relative to the main body in at least six different angular positions about the central axis which mutually include an angle of about 60°, so that each individual hair-cutting unit of the three hair-cutting units and each combination of two of the three hair-cutting units can be selectively arranged in said uppermost position relative to the main body.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
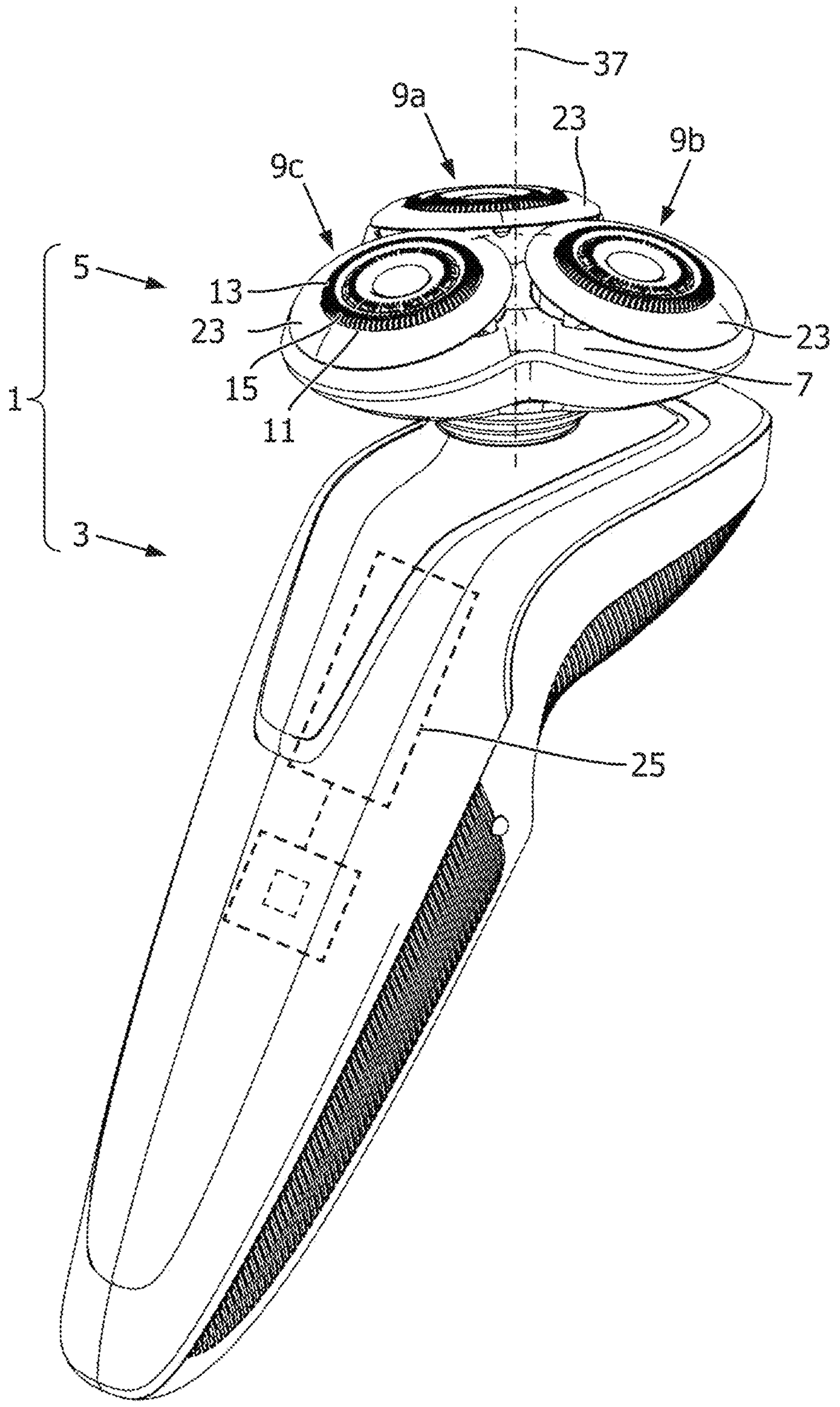
FIG. 1 shows a first embodiment of an electric shaver according to the invention.
Figure 2:
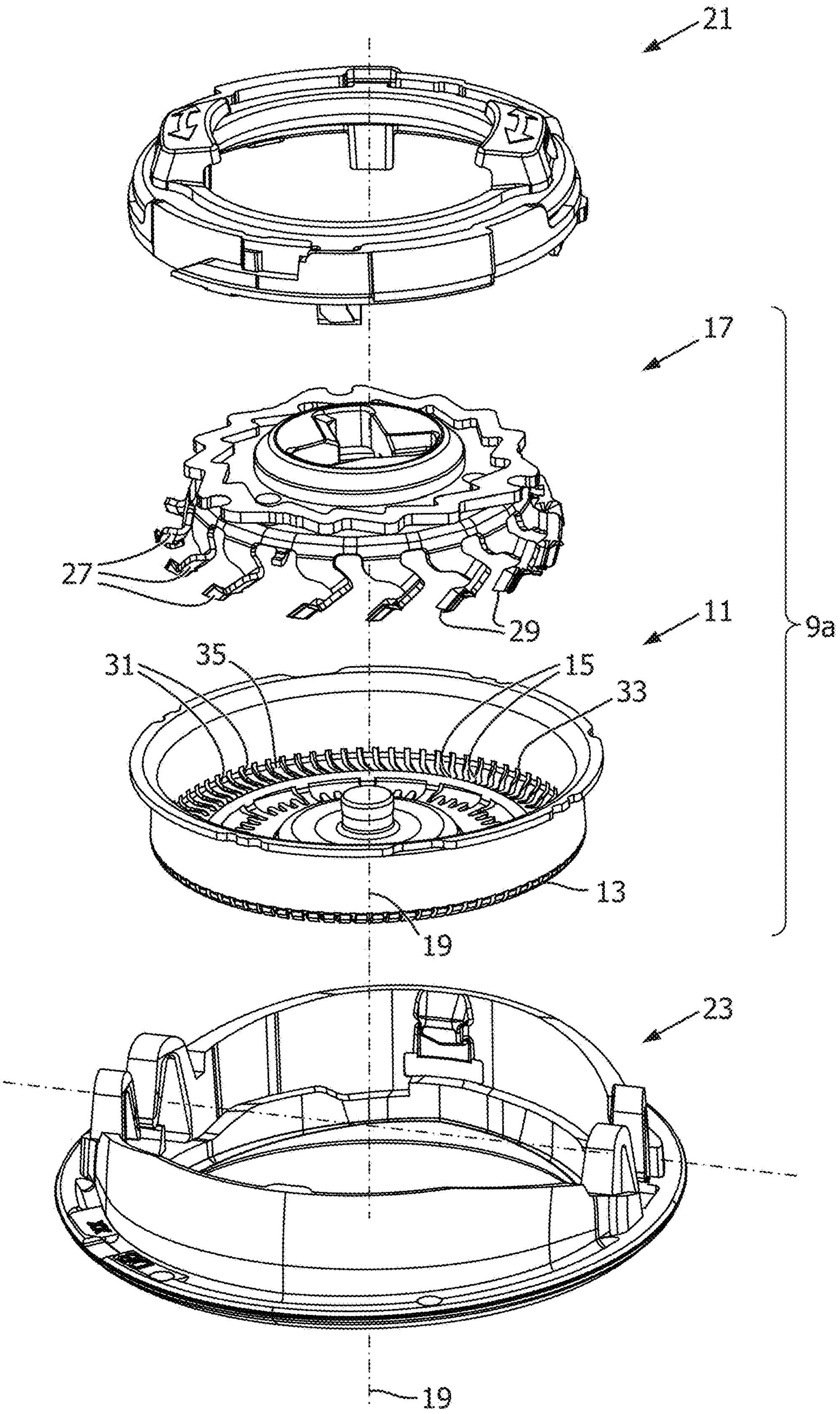
FIG. 2 is an exploded view of a hair-cutting unit of the electric shaver of FIG. 1.

FIG. 1 shows a first embodiment of an electric shaver 1 according to the invention. The shaver 1 comprises a main body 3 designed to be held by a user's hand during use. The shaver 1 further comprises a shaving unit 5 which is coupled to the main body 3. The shaving unit 5 comprises a supporting member 7 and three hair-cutting units 9*a*, 9*b*, 9*c* which are supported by the supporting member 7 in a tri-angular configuration. FIG. 2 shows the parts of one of the hair-cutting units 9*a* in an exploded view and oriented upside down. The other two hair-cutting units 9*b*, 9*c* have comparable parts. As shown in FIG. 1 and FIG. 2, each hair-cutting unit 9*a*, 9*b*, 9*c* comprises an external cutting member 11 which has an annular skin-contact surface 13 provided with a plurality of hair-entry openings 15. Each hair-cutting unit 9*a*, 9*b*, 9*c* further has an internal cutting member 17. In the assembled condition of the hair-cutting unit 9*a*, 9*b*, 9*c* the internal cutting member 17 is arranged in and covered by the external cutting member 11 and is rotatable relative to the external cutting member 11 about an axis of rotation 19. In said assembled condition, the internal cutting member 17 is held in position in the external cutting member 11 by means of a holding member 21. The holding member 21 is releasbly coupled to a skin-supporting rim 23 of the hair-cutting unit 9*a*, 9*b*, 9*c* which, in the assembled condition, surrounds the external cutting member 11. The skin-supporting rims 23 of the hair-cutting units 9*a*, 9*b*, 9*c* are each mounted to the supporting member 7, preferably in a pivotal way such that the hair-cutting units 9*a*, 9*b*, 9*c* can adapt their orientations relative to the supporting member 7 in order to follow local contours on the user's face during use.

The main body 3 accommodates an electric motor 25 which is only schematically shown in FIG. 1. The electric motor 25 is arranged to drive the internal cutting members 17 into rotation relative to the external cutting members 11 during use, in particular via a mechanical transmission which is not shown in the figures for simplicity reasons and which can be of any type well known to the skilled person. As shown in FIG. 2, the internal cutting member 17 is provided with a plurality of hair-cutting elements 27 arranged in an annular configuration for co-operation with the hair-entry openings 15 provided in the annular skin-contact surface 13 of the external cutting member 11. The hair-cutting elements 27 are each provided with a cutting edge 29 arranged for co-operation with counter cutting edges 31 which are provided as edges of the hair-entry openings 15 on an annular inner surface 33 of the external cutting member 11. During use, hairs that penetrate into the external cutting member 11 via the hair-entry openings 15 are cut between the cutting edges 29 of the internal cutting member 17 and the counter cutting edges 31 of the external cutting member 11 as a result of the rotation of the internal cutting member 17.

Figure 3:
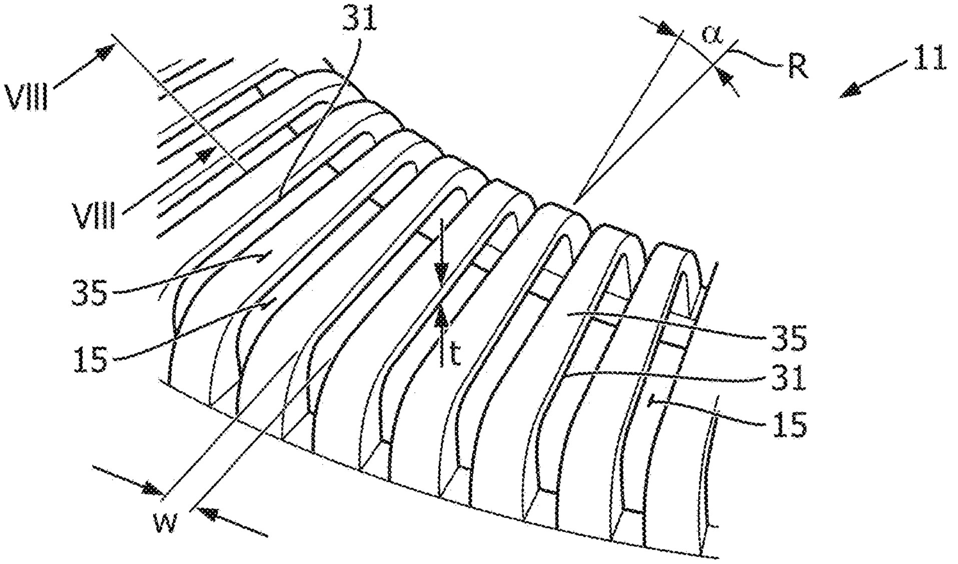
FIG. 3 shows in detail a number of hair-entry openings of an external cutting member of the hair-cutting unit of FIG. 2.
Figure 4A:
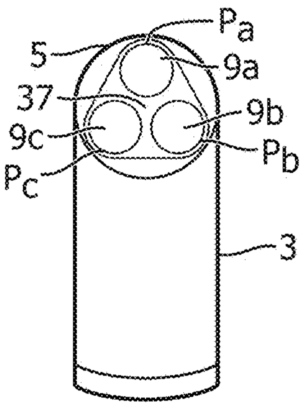
FIGS. 4*a*-4*f* schematically show a number of different angular positions in which a shaving unit of the electric shaver of FIG. 1 is positionable relative to a main body of the electric shaver.
Figure 4B:
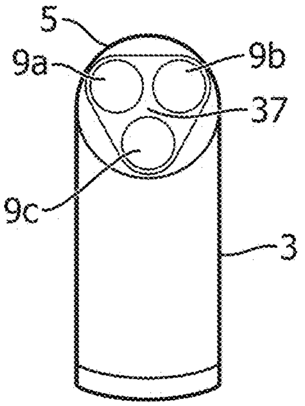
Figure 4C:
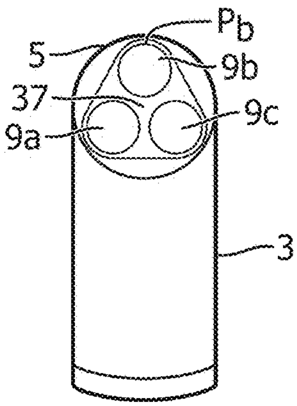
Figure 4D:
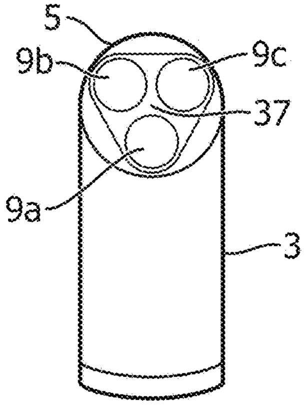
Figure 4E:
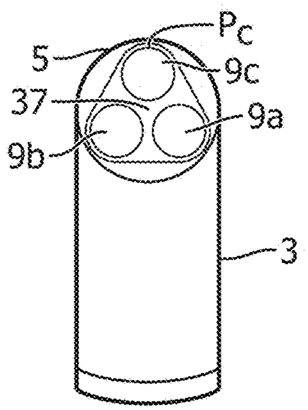
Figure 4F:
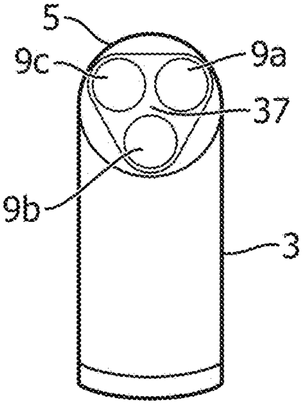

The hair-cutting process of the hair-cutting units 9*a*, 9*b*, 9*c* and the overall shaving result of the electric shaver 1 are influenced by a number of geometric parameters of the hair-cutting units 9*a*, 9*b*, 9*c*. Important aspects of the overall shaving result are the closeness of the hair-cutting process, i.e. the hair-stubble length remaining after the hair-cutting process, and the degree of skin irritation caused by the hair-cutting process. As a general rule, skin irritation will increase with increasing closeness. An example of a geometric parameter that influences the shaving result is a width w of the hair-entry openings 15 provided in the external cutting member 11 of the hair-cutting unit 9*a*, 9*b*, 9*c*. As shown in FIG. 3, in the embodiment of the electric shaver 1 the hair-entry openings 15 are slot-shaped, and their width is indicated by w. An increasing width w of the hair-entry openings 15 will increase the degree of skin doming into the hair-entry openings 15. This will result in an increase of the closeness of the hair-cutting process, but will also increase the level of skin irritation. Another example of a geometric parameter that influences the shaving result is a depth of the hair-entry openings 15, which corresponds to a thickness t of the strip-shaped wall portions 35 of the external cutting member 11 arranged between the hair-entry openings 15, as shown in FIG. 3. An increasing depth of the hair-entry openings 15, i.e. an increasing thickness t of the wall portions 35, will decrease the degree of skin doming into the hair-entry openings 15. This will result in a decrease of the closeness of the hair-cutting process, but will also decrease the level of skin irritation.

The present invention is based on the insight that, in an electric shaver comprising a shaving unit having at least three hair-cutting units of a rotary type, a degree at which each individual hair-cutting unit contributes to the overall shaving result of the shaving unit depends on the position of said individual hair-cutting unit relative to the main body and relative to the other hair-cutting units when the main body is held by the user's hand during the shaving process. In particular, in the electric shaver 1 with the three hair-cutting units 9*a*, 9*b*, 9*c* arranged in a tri-angular configuration as shown in FIG. 1, it was found that, when the main body 3 is held by the user's hand in an upright position during the shaving process, the two hair-cutting units 9*a*, 9*b* which are arranged in the uppermost position relative to the main body 3 have a more dominant influence on the overall shaving result of the shaving unit 5 as compared with the hair-cutting unit 9*c* which is arranged in the lowermost position. Based on this insight, the electric shaver 1 enables the user to adapt the overall shaving result of the shaving unit 5 to his personal needs in that the three hair-cutting units 9*a*, 9*b*, 9*c* have mutually different values for at least one geometric parameter that influences the hair-cutting process of each individual hair-cutting unit 9*a*, 9*b*, 9*c*, and in that the shaving unit 5 is configured to be positionable in at least three different angular positions about a central axis 37 of the supporting member 7 which extends transversely relative to the skin-contact surfaces 13 of the external cutting members 11.

In particular, the hair-cutting units 9*a*, 9*b*, 9*c* have mutually different values, respectively w1, w2 and w3, for the width w of the hair-entry openings 15, wherein w1<w2<w3. The shaving unit 5 can be positioned in six different angular positions about the central axis 37 relative to the main body 3, which mutually enclose angles of about 600 and are schematically shown in FIGS. 4*a*-4*f*. In a first angular position of the shaving unit 5 shown in FIG. 4*a*, the hair-cutting unit 9*a* with the smallest width w1 of the hair-entry openings 15 is in the uppermost dominant position relative to the main body 3, and the hair-cutting units 9*b*, 9*c* are in the lowermost position relative to the main body 3. Because in this first angular position of the shaving unit 5 the hair-cutting unit 9*a* with the smallest width w1 of the hair-entry openings 15 is in the most dominant position relative to the main body 3, the shaving unit 5 provides an overall shaving result with a relatively low closeness and a relatively low degree of skin irritation, i.e. with a relatively high degree of skin comfort. In the second, third, fourth, fifth and sixth angular position of the shaving unit 5 as respectively shown in the FIGS. 4*b*-4*f*, respectively the hair-cutting units 9*a*, 9*b*, the hair-cutting unit 9*b*, the hair-cutting units 9*b*, 9*c*, the hair-cutting unit 9*c* and the hair-cutting units 9*a*, 9*c* are in the uppermost dominant position relative to the main body 3. As a result, the fourth and fifth angular positions of the shaving unit 5 provide overall shaving results with a relatively high closeness but a relatively low degree of skin comfort, the second angular position of the shaving unit 5, like the first angular position of the shaving unit 5, provides an overall shaving result with a relatively low closeness but a relatively high degree of skin comfort, and the third and sixth angular positions of the shaving unit 5 provide shaving results with a medium closeness and a medium degree of skin comfort.

Figure 5:
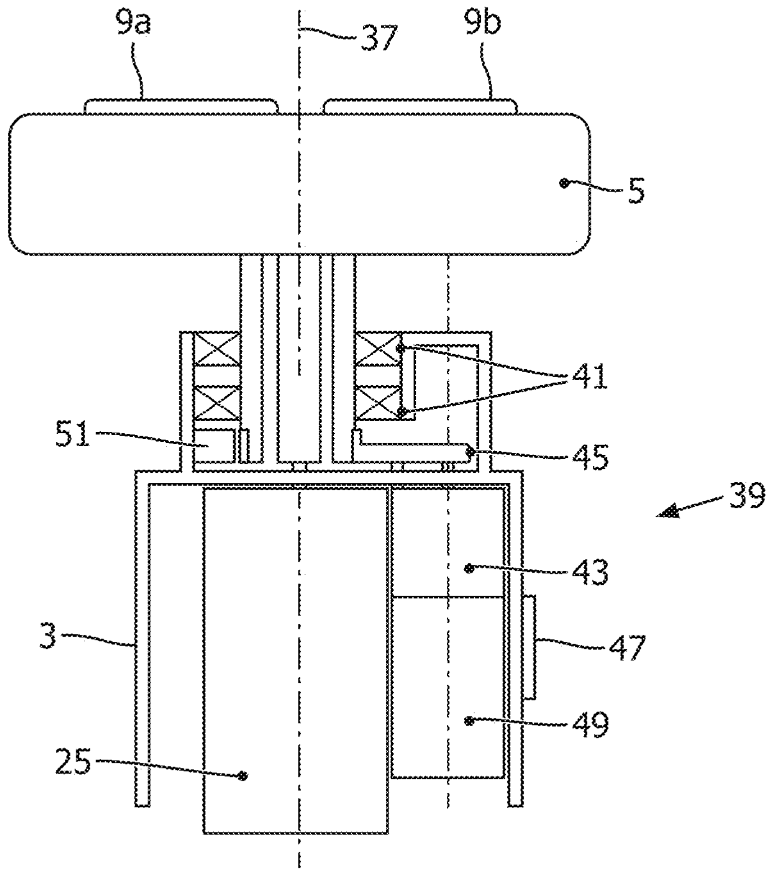
FIG. 5 schematically shows an actuator system of the electric shaver of FIG. 1 by means of which the shaving unit of the electric shaver can be positioned in the different angular positions as show in FIGS. 4*a*-4*f;*

The shaving unit 5 is positionable in each of the six different angular positions relative to the main body 3 as shown in FIGS. 4*a*-4*f* by means of an actuator system 39 which is schematically shown in FIG. 5. The shaving unit 5 is connected to the main body 3 by means of a rotational bearing 41 such as to be rotatable relative to the main body 3 about the central axis 37 of the shaving unit 5. The actuator system 39 comprises a secondary electric motor 43 which is accommodated in the main body 3 in addition to the electric motor 25. The secondary electric motor 43 can drive the shaving unit 5 into rotation relative to the main body 3 about the central axis 37 via a transmission system, for example a gear box 45 which is only schematically indicated in FIG. 5. A user can select each of the six different angular positions of the shaving unit 5 by means of a user interface 47 provided on the main body 3, which may comprise a selection knob or another well-known type of user input member. The user interface 47 is electrically connected to a control unit 49 of the actuator system 39 accommodated in the main body 3. The control unit 49 controls the secondary electric motor 43 in a manner known to the skilled person based on the input of the user interface 47 and the input of an angular position sensor 51, which is arranged on the main body 3 to measure the angular position of the shaving unit 5 relative to the main body 3.

In a modification of the first embodiment of the electric shaver 1, not shown in the figures, the actuator system 39 may be omitted and the shaving unit 5 may be manually rotatable by the user into each of the six angular positions relative to the main body 3 about the central axis 37 as shown in the FIGS. 4*a*-4*f*. In this embodiment, a known type of arrest member may be provided to releasably arrest the shaving unit 5 in each of the six angular positions relative to the main body 3 and to simultaneously provide the user with tactile feedback when reaching any of the six angular positions during manual rotation of the shaving unit 5 relative to the main body 3. Such an arrest member may for example comprise a spring-loaded ball provided on the main body 3 which may releasably engage any of six indentations provided with mutual angular interspaces of 60° on an annular collar mounted to the shaving unit 5 co-axially relative to the central axis 37.

Figure 6A:
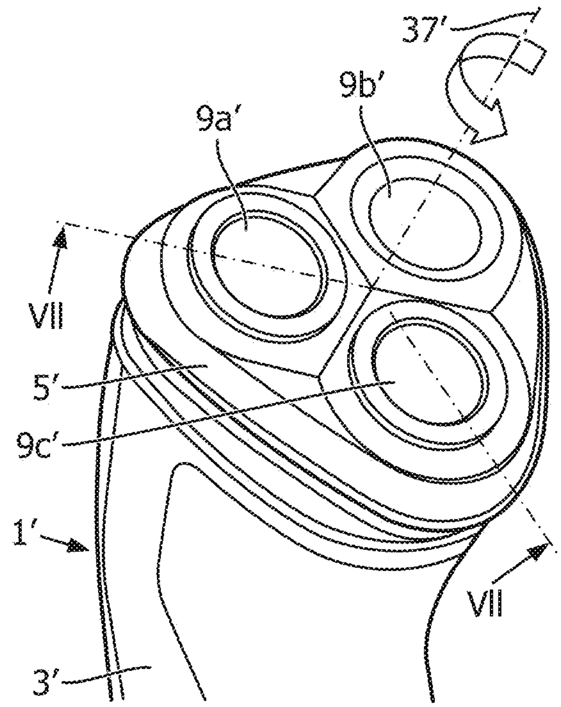
FIGS. 6*a* and 6*b* show a second embodiment of an electric shaver according to the invention.
Figure 6B:
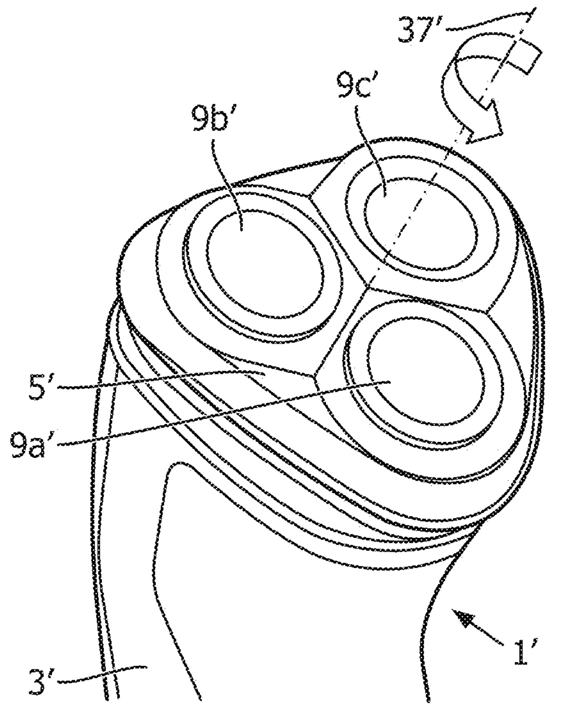
Figure 7:
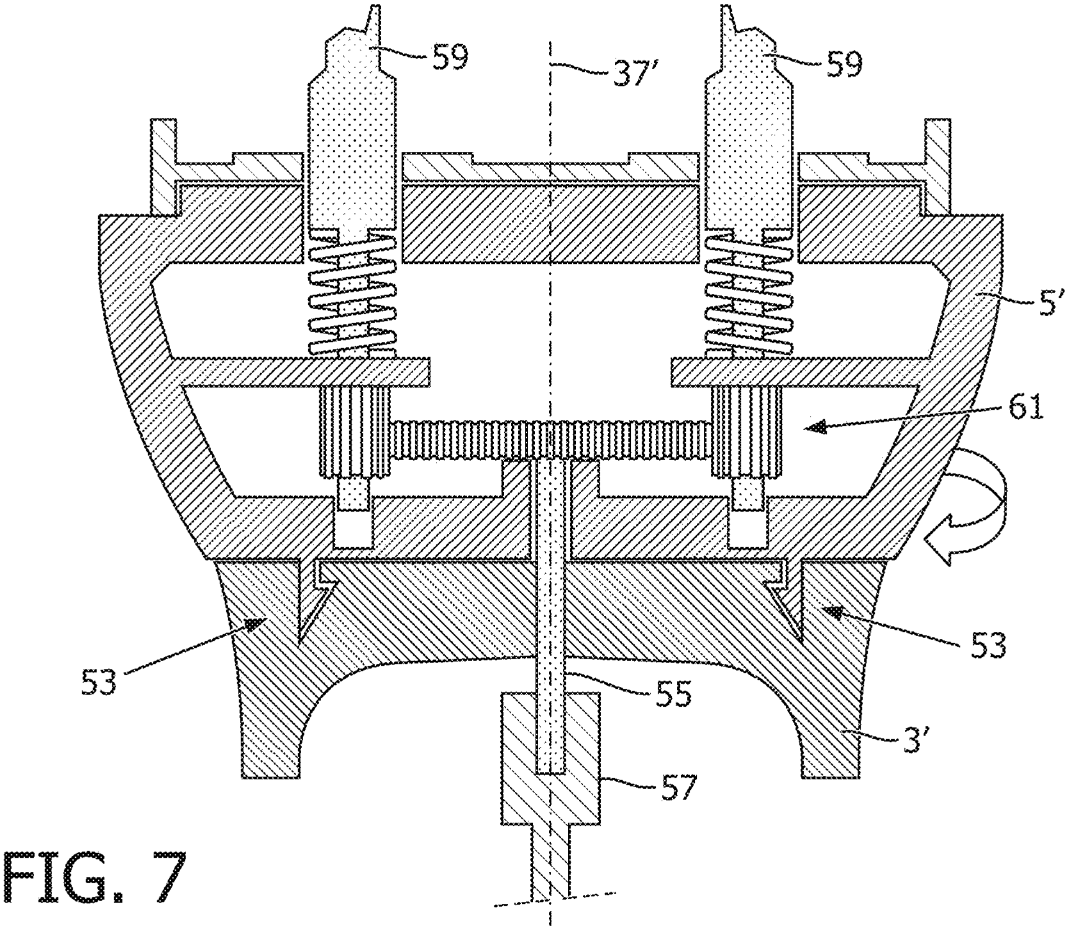
FIG. 7 shows a schematic cross-section of the electric shaver according to the line VII-VII in FIG. 6*a*.

FIGS. 6*a* and 6*b* show a second embodiment of an electric shaver 1' according to the invention. Parts of the electric shaver 1', which are similar to corresponding parts of the electric shaver 1 according to the first embodiment as described here before, are indicated in FIGS. 6*a* and 6*b* by similar reference numbers and will not be discussed in detail in the following. The electric shaver 1' is a simplified embodiment of the invention in that it does not comprise an actuator system to rotate the shaving unit 5' relative to the main body 3' into any of a number of different angular positions about the central axis 37' of the shaving unit 5'. Instead, the shaving unit 5' is manually decouplable from the main body 3' and manually couplable to the main body 3' into each of three different angular positions relative to the main body 3' about the central axis 37', wherein said three different angular positions mutually include angles of about 120°. For this purpose, as schematically shown in FIG. 7 which is a schematic cross-section of the electric shaver 1', the shaving unit 5' is releasably coupled to the main body 3' by means of three releasable coupling members 53, which may be of any kind well-known to the skilled person. The three coupling members 53 are symmetrically arranged around the central axis 37' at mutually included angles of 120°, such that the shaving unit 5' can be coupled to the main body 3' in each of said three different angular positions relative to the main body 3'. In the cross-section of FIG. 7, only two of the three coupling members 53 are visible, and they are schematically indicated as releasable snap connections. The user can manually decouple the shaving unit 5' from the main body 3' and manually reposition and couple the shaving unit 5' onto the main body 3' in any of said three different angular positions relative to the main body 3'. For this purpose, a central driven shaft 55 of the shaving unit 5' is releasably coupled to a drive shaft 57 which is accommodated in the main body 3' and coupled to the electric motor (not shown). The central driven shaft 55 is coupled to three drive spindles 59 by means of a transmission 61. The drive spindles 59 are each coupled to a respective one of the internal cutting members of the three hair-cutting units 9*a*', 9*b*', 9*c*', which are also not shown in FIG. 7. Only two of the three drive spindles 59 are visible in FIG. 7.

In a first of said three different angular positions of the shaving unit 5' relative to the main body 3', as shown in FIG. 6*a*, the hair-cutting units 9*a*' and 9*b*' are in the uppermost dominant position relative to the main body 3', and the hair-cutting unit 9*c*' is in the lowermost position relative to the main body 3'. Because in this first angular position of the shaving unit 5' the hair-cutting unit 9*a*' with the smallest width w1 of the hair-entry openings and the hair-cutting unit 9*b*' with the medium width w2 of the hair-entry openings are in the most dominant position relative to the main body 3', the shaving unit 5' provides an overall shaving result with a relatively low closeness and a relatively low degree of skin irritation, i.e. with a relatively high degree of skin comfort. In a second of said three different angular positions of the shaving unit 5' relative to the main body 3', as shown in FIG. 6*b*, the hair-cutting units 9*b*' and 9*c*' are in the uppermost dominant position relative to the main body 3', and the hair-cutting unit 9*a*' is in the lowermost position relative to the main body 3'. Because in this second angular position of the shaving unit 5' the hair-cutting unit 9*b*' with the medium width w2 of the hair-entry openings and the hair-cutting unit 9*c*' with the largest width w3 of the hair-entry openings are in the most dominant position relative to the main body 3', the shaving unit 5' provides an overall shaving result with a relatively high closeness and a relatively high degree of skin irritation, i.e. with a relatively low degree of skin comfort. In a third of said three different angular positions of the shaving unit 5' relative to the main body 3', not shown in the figures, the hair-cutting units 9*a*' and 9*c*' are in the uppermost dominant position relative to the main body 3', and the hair-cutting unit 9*b*' is in the lowermost position relative to the main body 3'. Because in this third angular position of the shaving unit 5' the hair-cutting unit 9*a*' with the lowest width w1 of the hair-entry openings and the hair-cutting unit 9*c*' with the largest width w3 of the hair-entry openings are in the most dominant position relative to the main body 3', the shaving unit 5' provides an overall shaving result with a medium closeness and a medium degree of skin irritation, i.e. with a medium degree of skin comfort.

In the first and second embodiments of the electric shaver 1, 1' according to the invention as described here before, the hair-cutting units 9, 9' have mutually different values for the width of the hair-entry openings 15. Instead thereof or in addition thereto, the hair-cutting units 9. 9' may have mutually different values for another geometric parameter of the hair-entry openings 15 that influences the hair-cutting process of the individual hair-cutting units 9. 9'. An example of such a geometric parameter is the depth of the hair-entry openings 15, which corresponds to the thickness t of the strip-shaped wall portions 35 of the external cutting members 11 arranged between the hair-entry openings 15, as already mentioned here before and shown in FIG. 3. Another example of such a geometric parameter is the longitudinal orientation of the slot-shaped hair-entry openings 15, in particular the angle α relative to the radial direction R as shown in FIG. 3. The angle α in particular influences a maximum length of the hairs that can optimally enter into the hair-entry openings 15 during the shaving process. Thus, by providing the three hair-cutting units 9, 9' with mutually different angles α for the longitudinal orientation of the hair-entry openings 15, the user can select between optimum shaving results for different hair lengths. In embodiments wherein the hair-cutting units have round or circular hair-entry openings (not shown in the figures), the hair-cutting units may have different values for the diameter of the hair-entry openings. The diameter of the hair-entry openings influences the closeness and the degree of skin comfort in a way similar to the width w of the slot-shaped hair-entry openings 15, of the hair-cutting units 9, 9'.

Figure 8:
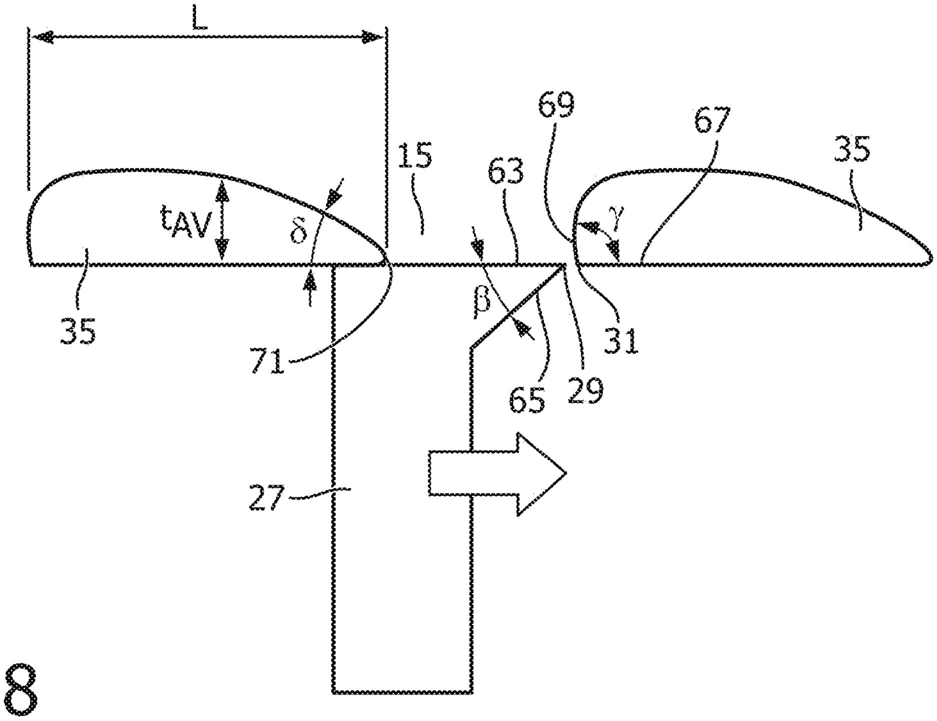
FIG. 8 shows a schematic cross-section of the hair-cutting unit of FIG. 2 in an assembled condition according to the line VIII-VIII in FIG. 3.

Instead of or in addition to the one or more geometric parameters of the hair-entry openings 15, the hair-cutting units 9, 9' may have mutually different values for another type of geometric parameter of the hair-cutting units 9, 9' that influences the hair-cutting process of each individual hair-cutting unit 9, 9'. An example is a geometric parameter of the cutting edges 29 provided on the cutting elements 27 of the internal cutting members 17, or a geometric parameter of the counter cutting edges 31 provided on the hair-entry openings 15 of the external cutting members 11. An example is the wedge angle β enclosed by the facets 63, 65 of the cutting edges 29 as schematically shown in FIG. 8, which represents a schematic cross-section of the hair-cutting unit 9, 9'. Other examples are the wedge angle γ enclosed by the facets 67, 69 of the counter cutting edges 31 as schematically shown in FIG. 8, an orientation (not shown) of the cutting edges 29 and/or the counter cutting edges 31 relative to the radial direction, and a shearing angle (not shown) enclosed by the cutting edges 29 and the counter cutting edges 31 at a hair-cutting location. All such geometric parameters of the cutting edges 29 and the counter cutting edges 31 have a particular influence on the hair-cutting efficiency and the degree of skin irritation, so that differences of these geometrical parameters present between the hair-cutting units 9, 9' enable the user to adapt the overall shaving result of the shaving unit 5, 5' to his personal needs by positioning the shaving unit 5, 5' in a suitable angular position relative to the main body 3, 3'.

Another type of geometric parameter of the hair-cutting units 9, 9' that influences the hair-cutting process of each individual hair-cutting unit 9, 9' is a geometric parameter of a cross-sectional profile of the strip-shaped wall portions 35 of the external cutting members 11 arranged between the hair-entry openings 15, as shown in FIG. 8. Examples of such geometric parameters are an average thickness $t_{AV}$ or a length L of said profile, or a wedge angle δ at the edges 71 of the wall portions 35 opposite to the counter cutting edges 31. All such operational parameters at least influence the degree of skin doming into the hair-entry openings 15 and, thereby, influence at least the degree of skin comfort.

As will be understood, the invention covers embodiments wherein the hair-cutting units 9, 9' have mutually different values for only one geometric parameter that influences the hair-cutting process of each individual hair-cutting unit 9, 9', as well as embodiments wherein the hair-cutting units 9, 9' have mutually different values for two or more than two geometric parameters that each influence the hair-cutting process of each individual hair-cutting unit 9, 9'. Examples of suitable geometric parameters have been described here before. The object of the invention may also be achieved, although maybe to a smaller extent, by embodiments wherein two of the hair-cutting units 9, 9' are mutually identical and wherein only one of the hair-cutting units 9, 9' has a different value for a particular geometric parameter as compared with the two identical hair-cutting units 9, 9'.

The invention is not limited to embodiments wherein the value of the one or more geometric parameters, that differs between the hair-cutting units, is constant in each position on each individual hair-cutting unit. This will be explained in more detail in the example wherein the geometric parameter is the width of the hair-entry openings 15, but applies equally to other types of geometric parameters as for example described here before. In other words, the invention covers embodiments wherein the value of the geometric parameter, i.e. in this case the width of the hair-entry openings, is different for different locations on each individual hair-cutting unit 9, 9'. In such embodiments, it will be clear that the width of the hair-entry openings 15 should be different for corresponding hair-entry openings 15 of the three hair-cutting units 9*a*, 9*b*, 9*c*. In general, corresponding hair-entry openings 15 are to be understood as hair-entry openings present in corresponding positions on the three hair-cutting units 9*a*, 9*b*, 9*c*, preferably when considering identical positions of the hair-cutting units 9*a*, 9*b*, 9*c* with respect to the main body 3. Thus, as shown in FIGS. 4*a*-4*f*, corresponding positions on the three hair-cutting units 9*a*, 9*b*, 9*c* are for example the positions Pa, Pb and Pc as indicated in FIG. 4, which are mutually identical for corresponding positions of the hair-cutting units 9*a*, 9*b*, 9*c* with respect to the main body 3.

The invention is also not limited to embodiments wherein the shaving unit can be positioned relative to the main body in at least three different angular positions about the central axis of the shaving unit, as in the first and second embodiments of the electric shaver 1, 1' as described here before. It will be understood that the object of the invention may also be achieved, although maybe to a smaller extent, by embodiments wherein the shaving unit can be positioned relative to the main body in only two different angular positions about the central axis of the shaving unit.

It is finally noted that the invention also covers embodiments wherein the shaving unit has more than three individual hair-cutting units. It will be understood that, also in such embodiments with four or more hair-cutting units, the individual hair-cutting units will provide a more dominant or a less dominant contribution to the overall shaving result of the shaving unit depending on their positions relative to the main body and depending on their mutual positions. Thus, also in these embodiments the user can adapt the overall shaving result of the electric shaver by repositioning the shaving unit relative to the main body in a manner as described in detail here before with respect to the first and second embodiments of the electric shaver 1, 1'.

The invention claimed is:

1. Electric shaver comprising a main body and a shaving unit coupled to the main body, wherein:

the shaving unit comprises at least three hair-cutting units and a supporting member supporting the at least three hair-cutting units;

each hair-cutting unit comprises an external cutting member with a skin-contact surface provided with hair-entry openings, and an internal cutting member which is rotatable relative to the external cutting member;

the hair-cutting units each have at least one geometric parameter (w) relating to a corresponding geometric property of the hair-cutting units, wherein a hair-cutting process of each individual hair-cutting unit is influenced by a value of said at least one geometric parameter of said individual hair-cutting unit;

the supporting member has a central axis which extends transversely relative to the skin-contact surfaces of the external cutting members; and the shaving unit is configured to be positionable in at least two different angular positions about the central axis relative to the main body and coupled to the main body; characterized in that the value of said at least one geometric parameter of at least one of the hair-cutting units is different from the values of said at least one geometric parameter of the other hair-cutting units.

2. Electric shaver as claimed in claim 1, wherein the shaving unit is manually decouplable from the main body and manually couplable to the main body into each of said at least two different angular positions about the central axis.

3. Electric shaver as claimed in claim 1, wherein the shaving unit is coupled to the main body such as to be rotatable relative to the main body about the central axis into each of said at least two different angular positions.

4. Electric shaver as claimed in claim 3, wherein the shaving unit is rotatable relative to the main body by means of an actuator.

5. Electric shaver as claimed in claim 1, wherein the value of said at least one geometric parameter of each hair-cutting unit is different from the value of said at least one geometric parameter of each of the other hair-cutting units.

6. Electric shaver as claimed in claim 1, wherein the shaving unit comprises three hair-cutting units mutually arranged in a tri-angular configuration, and wherein the shaving unit is configured to be positionable in at least three different angular positions about the central axis relative to the main body.

7. Electric shaver as claimed in claim 1, wherein the at least one geometric parameter is at least one of:

a geometric parameter of the hair-entry openings in corresponding positions on the external cutting members of the hair-cutting units;

a geometric parameter of a cutting edge in corresponding positions on the internal cutting members or on the external cutting members of the hair-cutting units;

a geometric parameter of a cross-sectional profile of a wall section of the external cutting member present between adjacent hair-entry openings in corresponding positions on the external cutting members of the hair-cutting units.

* * * * *